United States Patent
Poornachandran et al.

(10) Patent No.: US 10,127,406 B2
(45) Date of Patent: Nov. 13, 2018

(54) DIGITAL RIGHTS MANAGEMENT PLAYBACK GLITCH AVOIDANCE

(71) Applicant: Intel Corporation, Santa Clara, CA (US)

(72) Inventors: Rajesh Poornachandran, Portland, OR (US); Ned M. Smith, Beaverton, OR (US)

(73) Assignee: INTEL CORPORATION, Santa Clara, CA (US)

(*) Notice: Subject to any disclaimer, the term of this patent is extended or adjusted under 35 U.S.C. 154(b) by 0 days.

(21) Appl. No.: 14/666,202

(22) Filed: Mar. 23, 2015

(65) Prior Publication Data
US 2016/0285870 A1     Sep. 29, 2016

(51) Int. Cl.
| | | |
|---|---|---|
| *G06F 21/00* | (2013.01) | |
| *G06F 21/81* | (2013.01) | |
| *G06F 1/32* | (2006.01) | |
| *H04L 29/06* | (2006.01) | |
| *G06F 21/10* | (2013.01) | |

(52) U.S. Cl.
CPC .......... *G06F 21/81* (2013.01); *G06F 1/3287* (2013.01); *G06F 21/10* (2013.01); *H04L 63/0428* (2013.01); *H04L 63/061* (2013.01); *H04L 63/0876* (2013.01)

(58) Field of Classification Search
None
See application file for complete search history.

(56) References Cited

U.S. PATENT DOCUMENTS

| | | | |
|---|---|---|---|
| 6,597,620 B1* | 7/2003 | McMinn | G11C 7/20 327/544 |
| 2005/0055524 A1 | 3/2005 | Gulick et al. | |
| 2005/0138377 A1* | 6/2005 | First | G06F 21/305 713/169 |
| 2005/0273635 A1* | 12/2005 | Wilcox | G06F 1/26 713/320 |
| 2007/0110225 A1* | 5/2007 | Leventhal | H04L 9/0618 380/28 |
| 2009/0144472 A1 | 6/2009 | Montgomery et al. | |
| 2010/0131968 A1* | 5/2010 | Newell | H04N 7/162 725/4 |
| 2011/0238967 A1* | 9/2011 | Challener | G06F 9/52 713/1 |
| 2012/0079277 A1* | 3/2012 | Ng | H04L 9/0822 713/171 |

(Continued)

OTHER PUBLICATIONS

International Search Report and Written Opinion received for PCT Patent Application No. PCT/US2016/023669, dated May 19, 2016, 10 pages.

*Primary Examiner* — Eleni A Shiferaw
*Assistant Examiner* — Andrew J Steinle

(57) ABSTRACT

Various embodiments are generally directed to the provision re-provision of encryption keys to access encrypted media. Encryption keys may be provisioned and re-provisioned to components, such as, processor elements, of a system based on power state transitions of the components. An encryption key may be provisioned to a component and then re-provisioned to the component before or after the component transitions from an active power state to another power state and back to the active power state.

25 Claims, 9 Drawing Sheets

(56) References Cited

U.S. PATENT DOCUMENTS

2014/0089650 A1\* 3/2014 Polzin ................... G06F 12/14
713/2
2014/0143577 A1\* 5/2014 Nachimuthu .......... G06F 12/08
713/324

\* cited by examiner

DIGITAL RIGHTS MANAGEMENT PLAYBACK GLITCH AVOIDANCE

TECHNICAL FIELD

Embodiments described herein generally relate to encrypted media and particularly to playback of encrypted media.

BACKGROUND

Media accessible by a computing device may include security mechanisms to control the access (e.g., use, or the like) of such media. For example, audio and video files playable by a computing device may include security mechanisms to control the playing, viewing, storing, and/or copying of the files. Such security mechanisms are generally referred to as digital rights management (DRM).

Mechanism to access DRM media may provide secure hardware paths to render (e.g., play, display, or the like) the DRM media. For example, a secure hardware path can include various hardware components (e.g., trusted execution environment, processing element, graphics processor, video decoder, video encoder, display controller, or the like) that use encryption keys to control access to the DRM media. A particular component of the system (e.g., trusted execution environment, or the like) may provision these encryption keys using a secure channel. With modern computing devices, the various components of the system are often able to change power states (e.g., for power efficiency purposes, or the like). For example, these components may change from an active power state to a clock gated power state, a power gated state, and off state, or the like. The transition between power states of each component may be independent of each other, and further, may not be synchronized with each other.

Such power state transitions may result in "glitches" with playback of DRM media. In particular, a power state transition from, for example, an active state to a power gated state, may cause the transitioning component to lose the encryption keys needed to process the DRM media. Said differently, a component may lose any necessary encryption keys when performing an asynchronous power state transition. Accordingly, frames or portions of the DRM media yet to be processes may not be processed correctly and may manifest as missing, jumbled, distorted, or otherwise inaccurate portions of the media (e.g., missing frames of a video, or the like).

It is with respect to these and other considerations that the embodiments described herein are needed.

DETAILED DESCRIPTION

Figure 1:
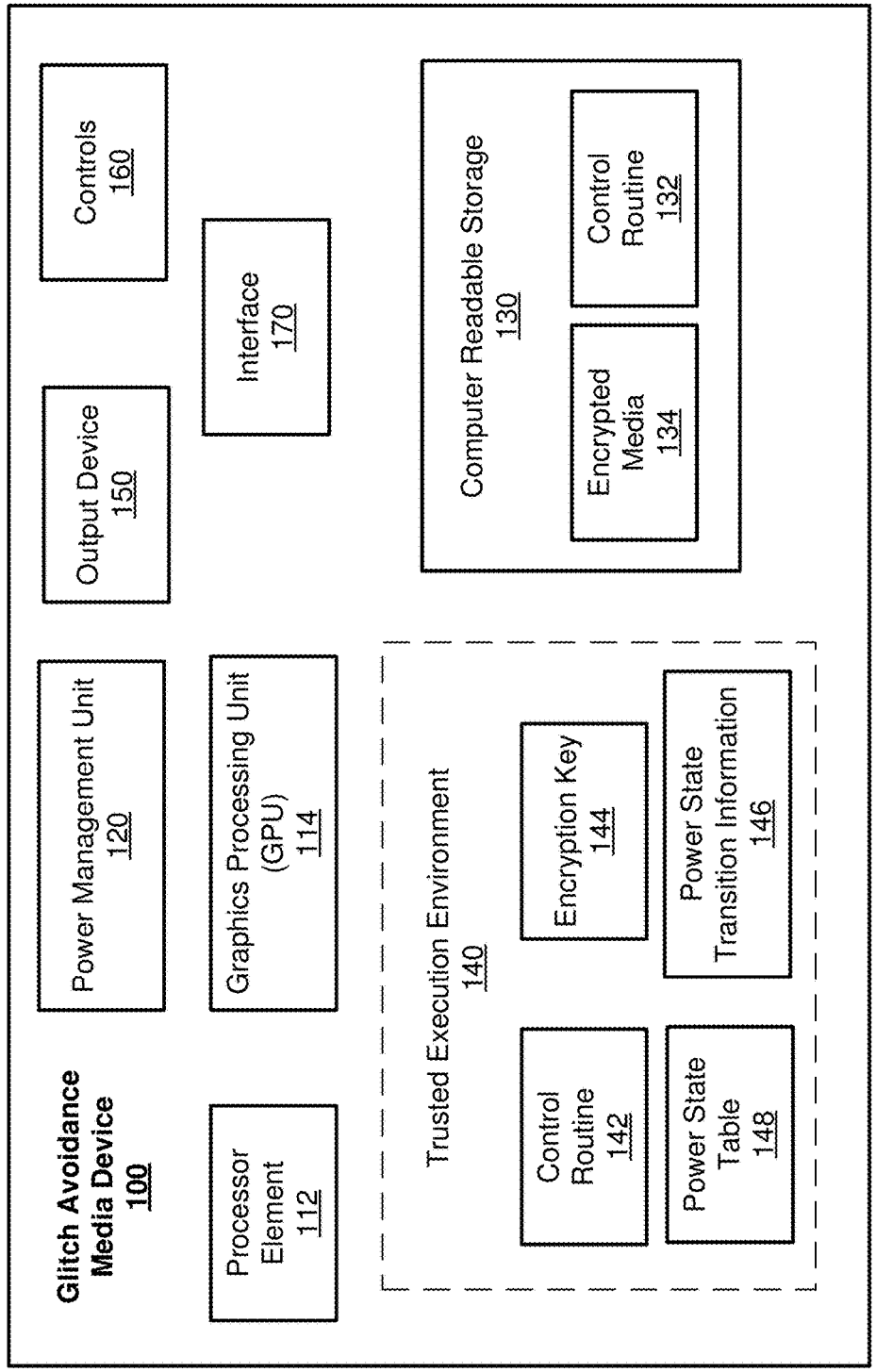
FIG. 1 illustrates a block diagram of a device according to an embodiment.

Various embodiments are generally directed to the provisioning and re-provisioning of encryption keys for playback of encrypted media. In particular, the present disclosure may be implemented to re-provision encryption keys based on power state transitions of components that process the encrypted media. The present disclosure may be implemented to provide a system for accessing and/or processing encrypted media to reduce glitches that may result from power state transitions of portions of the system accessing and/or processing the encrypted media. For example, a processing element configured to process encrypted media (e.g., a video decoder, a video encoder, a display driver, a graphics processor, or the like) may lose encryption keys when transitioning from an active power state to a lower power state. The present disclosure may be provided to re-provision the lost encryption key when the processing element transitions back to the active state. Accordingly, the processing of the encrypted media may continue without significant interruption even when the processing element undergoes an asynchronous power state transition.

In general, the present disclosure provides a secure environment where encryption keys for accessing encrypted media can be provisioned to components of a device and/or system. Additionally, the power state transitions of these various components are monitored to facilitate re-provisioning of the encryption keys based on power state transitions of the components. Accordingly, the present disclosure provides that "glitches" resulting from, for example, lost encryption keys due to a power state transition, may be avoided as the keys are re-provisioned when the power state transitions back to an active state. As such, encrypted media may be processed (e.g., played, displayed, or the like) without substantial loss in fidelity due to asynchronous power state transitions between different components of a media output system (e.g., processor, encoder, decoder, output driver, or the like). In some examples, the present disclosure may be implemented in accordance with a protected audio protected video (PAPV) encryption scheme.

With general reference to notations and nomenclature used herein, portions of the detailed description that follow may be presented in terms of program procedures executed on a computer or network of computers. These procedural descriptions and representations are used by those skilled in the art to most effectively convey the substance of their work to others skilled in the art. A procedure is here, and generally, conceived to be a self-consistent sequence of operations leading to a desired result. These operations are those requiring physical manipulations of physical quantities. Usually, though not necessarily, these quantities take the form of electrical, magnetic or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, these manipulations are often referred to in terms, such as adding or comparing, which are commonly associated with mental operations performed by a human operator. However, no such capability of a human operator is necessary, or desirable in most cases, in any of the operations described herein that form part of one or more embodiments. Rather, these operations are machine operations. Useful machines for performing operations of various embodiments include general purpose digital computers as selectively activated or configured by a computer program stored within that is written in accordance with the teachings herein, and/or include apparatus specially constructed for the required purpose. Various embodiments also relate to apparatus or systems for performing these operations. These apparatus may be specially constructed for the required purpose or may incorporate a general computing device. The required structure for a variety of these machines will appear from the description given.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, known structures and devices are shown in block diagram form in order to facilitate a description thereof. The intention is to provide a thorough description such that all modifications, equivalents, and alternatives within the scope of the claims are sufficiently described.

Additionally, reference may be made to variables, such as, "a", "b", "c", which are used to denote components where more than one component may be implemented. It is important to note, that there need not necessarily be multiple components and further, where multiple components are implemented, they need not be identical. Instead, use of variables to reference components in the figures is done for convenience and clarity of presentation.

FIG. 1 depicts a block diagram of a device for accessing encrypted media. In general, the encrypted media may be any media (e.g., audio, video, game, application, storage volume, or the like) where access to the media is controlled. In a particular example, the encrypted media may be content protected entertainment media, such as, for example, digital rights management (DRM) controlled audio and/or video. It is noted, the following examples reference video media, and particularly encrypted video files. However, this is not intended to be limiting and the present disclosure may be applied to account for asynchronous power state transitions of various hardware blocks processing and/or accessing any of a variety of types of encrypted media.

The device 100 may be any of a variety of types of computing devices, including without limitation, a laptop computer, a netbook computer, an ultrabook computer, a tablet computer, a handheld personal data assistant, a smartphone, a body-worn computing device (e.g., incorporated into clothing,) a media streaming device, an audio computing device, a video computing device, a smart television, or the like.

With various examples, the device 100 incorporates one or more of processor element 112, a graphics processing unit (GPU) 114, a power management unit 120, a computer-readable storage 130, a trusted execution environment (TEE) 140, an output device 150, controls 160, and an interface 170. The computer-readable storage 130 stores one or more of a control routine 132 and encrypted media 134. The TEE 140 includes one or more of a control routine 142, encryption key 144, power state transition information 146, and power state table 148. Although not depicted in this figure, the device 100 may be operably connected to one or more networks, and particularly, may be operably coupled to one or more other devices via the network (e.g., refer to FIG. 3).

In general, the control routine 132 incorporates a sequence of instructions operative on the components of the device 100 (e.g., the processor element 112, the GPU 114, the power management unit 120, the output device 150, or the like) to implement logic to process and/or access the encrypted media 134. The control routine 142 incorporates a sequence of instructions operative on the TEE 140 to implement logic to provision the encryption key 144, receive power state information 146, determine the power state table 148, and/or re-provision the encryption key 144 based on the power state table 148 and/or the power state information 146.

In executing the control routine 132, the processor element 112 may receive the encrypted media 134. For example, the processor element 112 may receive the encrypted media 134 via the interface 170 or from a storage location (e.g., the computer-readable storage 130, another computer readable storage (not shown), or the like). Additionally, in executing the control routine 132, the processor element 112 and/or the GPU 114 may access the encrypted media 134. Said differently, in executing the control routine 132, the processor element 112 and/or the GPU 114 may cause the output device to "output" the contents of the encrypted media 134. For example, for encrypted video media (e.g., DRM video files, or the like), the processor element 112 and/or the GPU 114 may cause the output device to display the encrypted media. It is noted, that this process may involve receiving encryption key(s) (e.g., the encryption keys 144, or the like) needed to properly access the encrypted media 134.

It is noted, that the block diagram illustrated in FIG. 1 is a simplified illustration of the processing of encrypted media, such as, for example, DRM audio files, DRM video files, DRM streaming video files, or the like. In particular, in processing encrypted media (e.g., DRM media) various elements (e.g., processor circuit, logic, and/or features) are configured to securely access the encrypted media. These elements are sometimes referred to as display components, graphics components, encoder components, decoder components, or the like. Accordingly, with some examples, the device 100 may implement these elements (e.g., video encoder/decoder, or the like). However for purposes of clarity of presentation, these elements are not shown here.

In executing the control routine 142, the TEE 140 may be caused to provision the encryption key 144 to one or more components of the device 100 to facilitate accessing the encrypted media 134. It is important to note, that the TEE 140 may include a processing element (not shown) and/or may be implemented in a secure portion of the processor element 112. However, for purposes of clarity, the TEE is shown as separate from the processor element 112 and the computer readable storage 130. However, this is not intended to be limiting. In executing the control routine 142, the TEE 140 may provision the encryption key 144 to, for example, the GPU 114 for the GPU 114 to process the encrypted media 134. With some examples, the TEE 140 may provision the encryption key 144 via an Out-of-Band (OOB) channel (e.g., refer to FIG. 2).

Additionally, in executing the control routine 142, the TEE 140 may receive power state information 146 from the power management unit 120. With some examples, the power management unit 120 may be configured to control and/or manage the power state transitions of various components of the device 100. The power management unit 120 may comprise logic, features, and/or instructions to monitor the power states of the components (e.g., the processor element 112, the GPU 114, the output device 150, or the like) of the device 100. For example, the processor element 112 and/or the GPU 114 may have a number of power states (e.g., refer to FIG. 5). As a specific example, the processor element 112 and/or the GPU 114 may have an active state (sometimes referred to as "D0*i*0"), a clock gated state (sometimes referred to as "D0*i*1"), a power gated state (sometimes referred to as "D0*i*3"), and an off state (sometimes referred to as "D3").

In general, when components of the device 100 transition between power states, any encryption key(s) (e.g., the encryption key 144) may be lost. For example, the processor element 112 may store provisioned encryption key (e.g., in a secure memory location, in a register, in cache memory, or the like). However, when the processor element 112 transitions from an active state (e.g., D0*i*0) to a power gated state (e.g., D0*i*3) and back to an active state (e.g., D0*i*0) the stored encryption keys are lost due to the power state transition. It is important to note, that these keys are lost due to enforcing the security mechanism of the encrypted media scheme. It is further noted, that the encryption keys could be hard coded into memory of the processing element. However, this would compromise the security of the encryption scheme and is therefore, undesirable.

In executing the control routine 142, the TEE 140 may receive power state transition information 146 from the power management unit 120. The power state transition information 146 may include an indication that a component of the device 100 is transitioning (has transitioned, is scheduled to transition, or the like) between power states. In some examples, the power state transition information 146 may include indications that a component is transitioning between specific power states (e.g., between D0*i*0 and D0*i*3, from D0*i*3 to D0*i*0, from D0*i*0 to D0*i*3 and back to D0*i*0, or the like). For example, the power state information may include an indication the processor element 112 is to transitioning from D0*i*0 to D0*i*3 and back to D0*i*0.

In executing the control routine 142, the TEE 140 may generate the power state table 148 to include an indication of the power states of various components of the device 100 and encryption keys (e.g., the encryption key 144) provisioned to these components. In some examples, the power state table 148 may comprise a table, a bitmap, a state machine, or the like. In general, however, the power state table 148 may comprise indications of one or more of the current power state of various components of the device 100, the future power state of various components of the device 100, scheduled power state transitions of various components of the device 100, and/or encryption keys provisioned to the components.

In executing the control routine 142, the TEE 140 may determine whether an the encryption key 144 is provisioned to a component of the device 100, determine whether the component of the device 100 may lose the provisioned encryption key 144 based on the power state information 146 and/or the power state table 148, and re-provision the encryption key 144 based on the determination that the component of the device 100 has lost the provisioned encryption key.

For example, the TEE 140 may receive the power state transition information from the power management unit 120 to include an indication the processor element 112 is transitioning from active power state to a power gated power state and back to the active power state. Additionally, the TEE 140 may determine that the processor element 112 has been provisioned the encryption key 144 to access the encrypted media 134. The TEE 140 may re-provision the encryption key 144 to the processor element 112 when the processor element 112 transition back to the active power state to enable the processor element 112 to continue to process the encrypted media 134.

In various embodiments, the processor element 112 may include any of a wide variety of commercially available processors, including without limitation, an AMD® Athlon®, Duron® or Opteron® processor; an ARM® application, embedded or secure processor; an IBM® and/or Motorola® DragonBall® or PowerPC® processor; an IBM and/or Sony® Cell processor; or an Intel® Celeron®, Core (2) Duo®, Core (2) Quad®, Core i3®, Core i5®, Core i7®, Atom®, Itanium®, Pentium®, Xeon® or XScale® processor. Further, one or more of these processor elements may include a multi-core processor (whether the multiple cores coexist on the same or separate dies), and/or a multi-processor architecture of some other variety by which multiple physically separate processors are in some way linked. Furthermore, in various embodiments any number of the processor elements 110, 210, and/or 410 may include a trusted execution environment (e.g., Intel CSE®, Intel ME®, Intel VT®, Intel SGX®, ARM TrustedZone®, or the like) to provide for the processing and/or storing of sensitive information. The trusted execution environment may be access using the geo-location techniques described herein.

In various embodiments, the GPU 114 may include any of a wide variety of commercially available graphics processing units. Further, one or more of these graphics processing units may have dedicated memory, multiple-threaded processing and/or some other parallel processing capability.

In various embodiments, the power management unit 120 may include circuitry configured to manage and/or monitor power states of components of the device 100. For example, the power management unit 120 may comprise a power management integrated circuit (PMIC), a P-Unit, or the like, configured to control and/or monitor the power rails of components of the device 100.

In various embodiments, the storage 130 may be based on any of a wide variety of information storage technologies, possibly including volatile technologies requiring the uninterrupted provision of electric power, and possibly including technologies entailing the use of machine-readable storage media that may or may not be removable. Thus, each of these storages may include any of a wide variety of types (or combination of types) of storage devices, including without limitation, read-only memory (ROM), random-access memory (RAM), dynamic RAM (DRAM), Double-Data-Rate DRAM (DDR-DRAM), synchronous DRAM (SDRAM), static RAM (SRAM), programmable ROM (PROM), erasable programmable ROM (EPROM), electrically erasable programmable ROM (EEPROM), flash memory, polymer memory (e.g., ferroelectric polymer memory), ovonic memory, phase change or ferroelectric memory, silicon-oxide-nitride-oxide-silicon (SONOS) memory, magnetic or optical cards, one or more individual ferromagnetic disk drives, or a plurality of storage devices organized into one or more arrays (e.g., multiple ferromagnetic disk drives organized into a Redundant Array of Independent Disks array, or RAID array). It should be noted that although each of these storages is depicted as a single block, one or more of these may include multiple storage devices that may be based on differing storage technologies. Thus, for example, one or more of each of these depicted storages may represent a combination of an optical drive or flash memory card reader by which programs and/or data may be stored and conveyed on some form of machine-readable storage media, a ferromagnetic disk drive to store programs and/or data locally for a relatively extended period, and one or more volatile solid state memory devices enabling relatively quick access to programs and/or data (e.g., SRAM or DRAM). It should also be noted that each of these storages may be made up of multiple storage components based on identical storage technology, but which may be maintained separately as a result of specialization in use (e.g., some DRAM devices employed as a main storage while other DRAM devices employed as a distinct frame buffer of a graphics controller).

In various embodiments, the TEE 140 may comprise logic, functions, features, and/or storage to securely implement the functions described herein. It is important to note, that the TEE 140 may be incorporated into the processor element 112 and/or the storage 130. However, for purposes of clarity, the TEE 140 is depicted separate from the processor element 112 and the storage 130. In some examples, the TEE 140 may be implemented as a secure enclave, a secure co-processor, or the like.

In various embodiments, the output device 150 may be any of a variety of output devices, such as, for example, a display, a speaker, a haptic feedback device, or the like. In various embodiments, the controls 160 may be any of a variety of types of manually operable control including and not limited to one or more of a keyboard, mouse, keypad, touchpad, stylus, or the like. The output device may be local or remote and may be connected wirelessly or wired.

Figure 3:
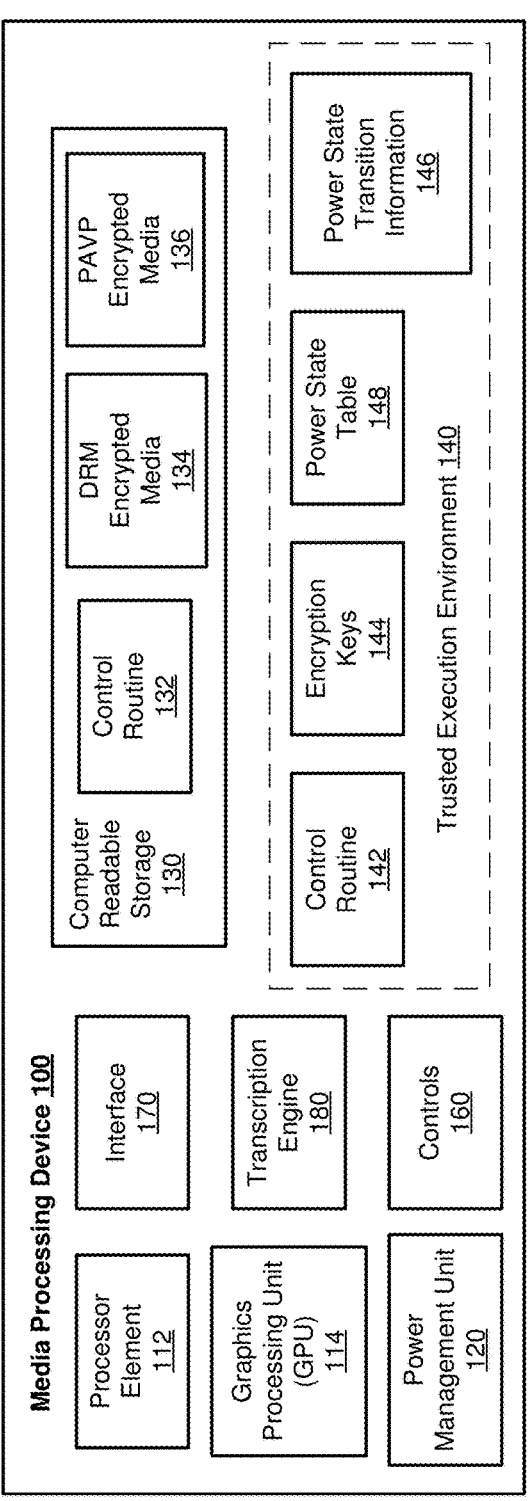
FIG. 3 illustrates a block diagram of a system according to an embodiment.
Figure 3:
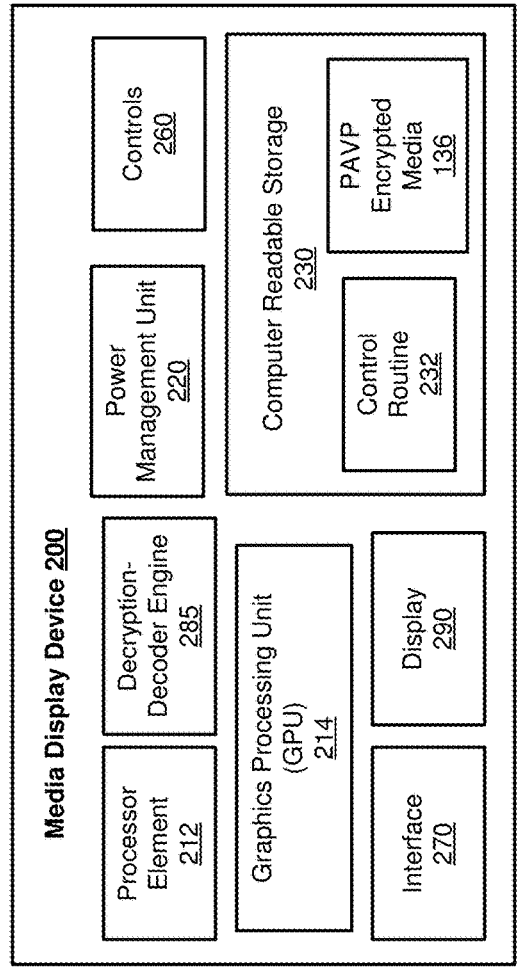
Figure 3:
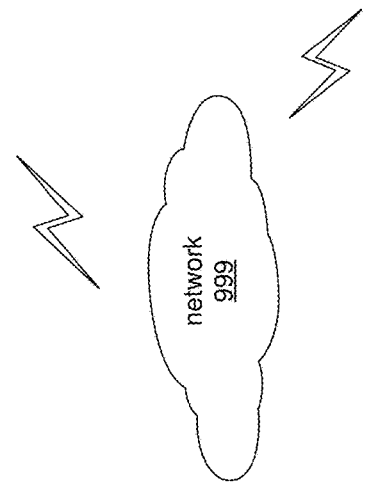

In various embodiments, the interface 170 may employ any of a wide variety of signaling technologies enabling the components to be coupled through a network (e.g., refer to FIG. 3). In particular, the device 100 may exchange signals (e.g., with another device, or the like) conveying information and/or data associated with the encrypted media 134.

Figure 2:
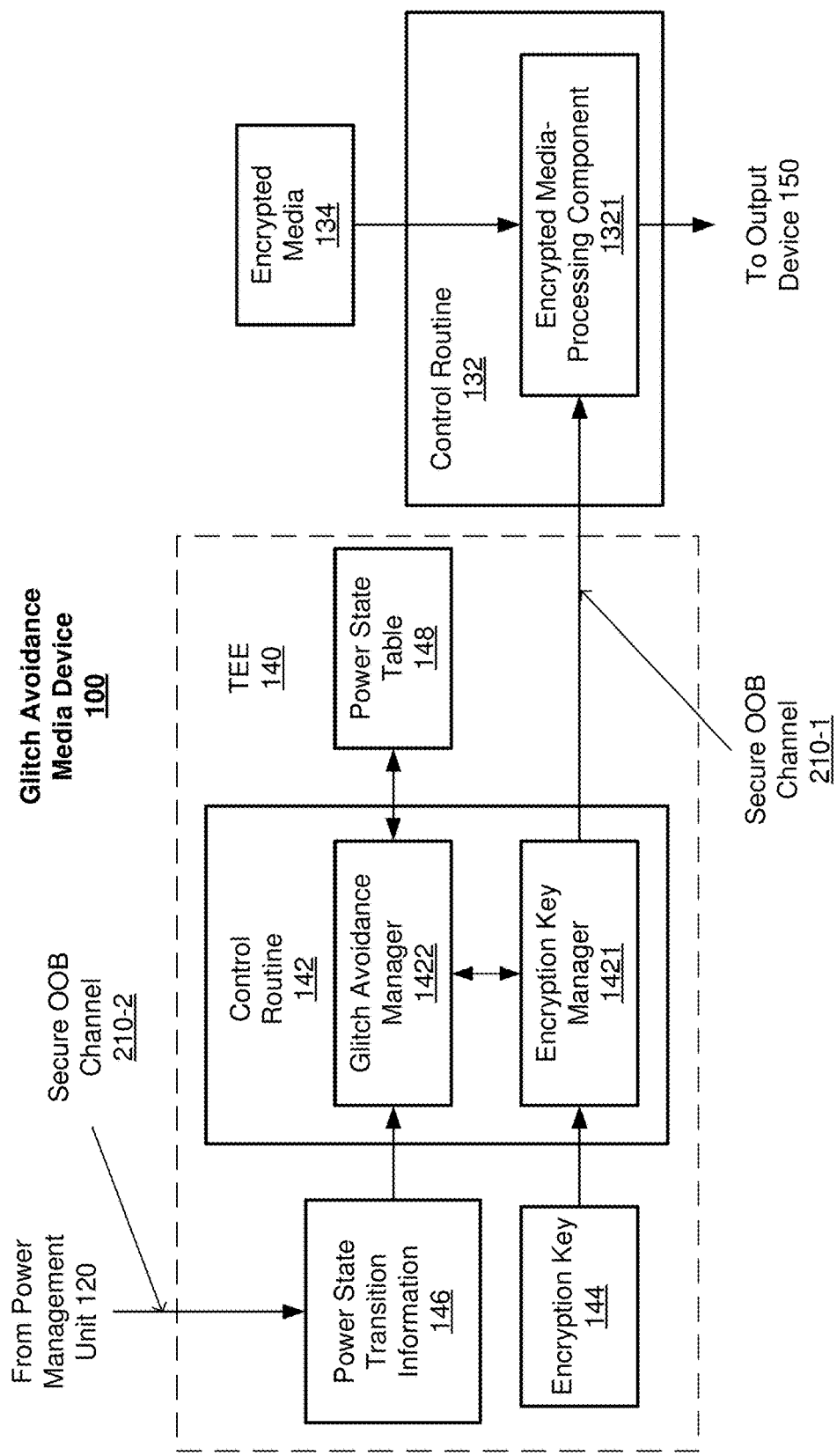
FIG. 2 illustrates a block diagram of aspects of the operation of the device of FIG. 1 according to an embodiment.

FIG. 2 is a block diagram of a portion of an embodiment of the glitch avoidance media device 100 of FIG. 1. In general, FIG. 2 illustrates aspects of the operation of the device 100. In particular, FIG. 2 illustrates aspects of the operation of the control routine 132 and the control routine 142 to access the encrypted media 134.

In various embodiments, the control routine 132 and/or the control routine 142 may include one or more of an operating system, device drivers and/or application-level routines (e.g., so-called "software suites" provided on disc media, "applets" obtained from a remote server, etc.). Where an operating system is included, the operating system may be any of a variety of available operating systems appropriate for whatever corresponding ones of the processor component 112. Where one or more device drivers are included, those device drivers may provide support for any of a variety of other components, whether hardware or software components, of the device 100.

In general, the control routine 132 is configured to "access" (e.g., play, display, or the like) the encrypted media using the output device 150. It is to be appreciated, that the device 100 may receive the encrypted media 134 from a variety of sources (e.g., the storage 130, another storage that is not shown, another computing device that is also not shown but that is connected to the computing device 100 over a network 999, or the like). The control routine 132 may comprise an encrypted media-processing component 1321.

The encrypted media-processing component 1321 receives the encryption key 144 from the TEE 140 via a secure Out-of-Band (OOB) channel 210-1. In general, the secure OOB channels 210-a may be secure communication path between components of the device 100. With some examples, the secure OOB channels 210-a may be a dedicated protected data bus, a communication path with data path protection, or the like.

Additionally, the encryption processor 1321 is configured to cause the device 100 to access (e.g., decrypt and play, display, or the like) the encrypted media 134. In some examples, the encrypted media-processing component 1321 sends a control signal to the processor component 112 and/or the GPU 114 to include an indication to decrypt the encrypted media 134 with the encryption key 144. In some examples, the encrypted media-processing component 1321 sends a control signal to the output device 150 to output the encrypted media 134 using the encryption key 144.

It is noted, that the encryption key 144 may be provisioned directly to the hardware component that is decrypting the encrypted media 134. Said differently, the encrypted media-processing component may comprise instructions that are executed by a component of the device 100 (e.g., the processor element 112, the GPU 114, the output device 150, or the like). As such, during operation, the encrypted media-processing component 1321 may receive the encryption keys 144 when executing on the hardware component. Said differently, the hardware component executing the instructions corresponding to the encrypted media-processing component 1321 may receive the encryption key 144 via the secure OOB channel 210-1.

Furthermore, during operation, the hardware component executing the encrypted media-processing component 1321 may change power states. For example, if the encrypted media-processing component 1321 is executing on the GPU 114 and the GPU 114 changes power states (e.g., from active power state to a power gated state and back to the active power state, or the like), the encryption key 144 may be lost. As such, continued processing of the encrypted media 134 may result in or be manifest as glitches in the media output.

As a specific example, the output device 150 may be a display and the encrypted media may be a DRM video file. Furthermore, the encrypted media-processing component 1321 may be a display component and/or driver configured to securely decrypt and cause the output device to display the frames of the DRM media file. Accordingly, the encrypted media-processing component 1321 may be provisioned the encryption key 144 to access the encrypted media 134. However, if the power button of the display were pressed (e.g., by a user, or the like) in the middle of playback of the DRM video file, the encryption key may be lost and processing and display of the DRM video file may be interrupted, or result in video glitches, even when the display is powered back on.

Accordingly, the TEE 140 may be configured to both provision and re-provision encryption keys based on power state transitions to reduce glitches in playback of encrypted media. The control routine 142 may comprise an encryption key manger 1421 and a glitch avoidance manager 1422. The encryption key manager 1421 may be configured to provision the encryption key 144 to the encrypted media-processing component 1321 as described above. In particular, the encryption key manager 1421 may be configured to provision the encryption key 144 to the encrypted media-processing component 1321 via the secure OOB channel 210-1.

The glitch avoidance manager (GAM) 1422 may be configured to receive power state transition information 146 from the power management unit 120. In particular, the GAM 1422 may be configured to receive power state transition information 146 from the power management unit 120 via a secure OOB channel 210-2. The GAM 1422 may generate and/or update the power state table 148 to include an indication of the power states, power state transitions, and/or provisioned encryption keys corresponding to the hardware components of the device 100 on which the encrypted media-processing component 1321 executes. For example, the GAM 1422 may receive power state transition information from the power management unit 120 to include an indication that the encrypted media-processing component 1321 is transitioning to/from a power state where the provisioned encryption key 144 may be lost. Accordingly, the GAM 1422 may determine to re-provision the encryption key 144 to the encrypted media-processing component 1321.

In some examples, the GAM 1422 may determine which encryption key was previously provisioned to the encrypted media-processing component 1321 and re-provision this same encryption key to the component 1321. With some examples, the GAM 1422 may send a control signal to the encryption key manager 1421 to cause the encryption key manager 1421 to re-provision the encryption key 144 to the encrypted media-processing component 1321.

Figure 4:
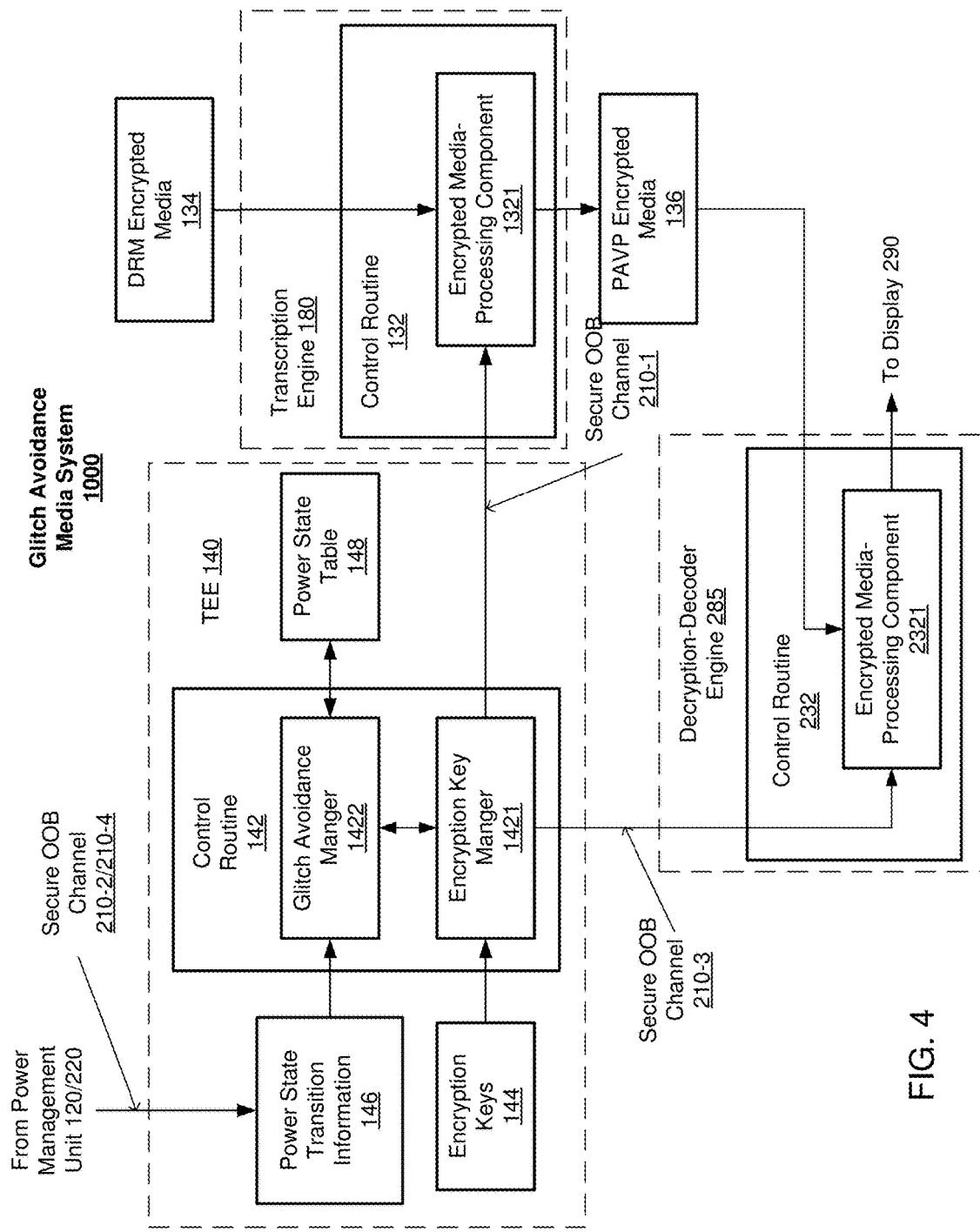
FIG. 4 illustrates a block diagram of aspects of the operation of the system of FIG. 3 according to an embodiment.

FIGS. 3-4 illustrate block diagrams of a glitch avoidance encrypted media access system 1000, according to embodiments of the present disclosure. The system 1000 is described with reference to the device 100 of FIGS. 1-2. In particular, components of the device 100 described above are referenced in the system 1000. This is done for purposes of brevity and clarity of presentation and not intended to be limiting. However, objects depicted in the drawings and referenced herein are denoted with similar numeric designation to provide clarity in intended meaning and operation of the objects. For example, a processor element 212 is depicted in FIG. 3. The processor element 212 is named similar to the processor element 112 described above and depicted in FIG. 1 to avoid needing to further describe what the processor element 212 may comprise. It is intended that the description above for the processor element 112 apply to the processor element 212 (and likewise for similarly denoted objects). However, it is not intended that the processor element 112 and 212 need be identical in an embodiment. In general, FIG. 3 illustrates the system 1000 while FIG. 4 illustrates aspects of the operation of the system 1000.

Turning more specifically to FIG. 3, a media processing device 100 and a media display device 200 are depicted. In general, the media processing device 100 may be any device configured to process encrypted and/or protected media, such as, for example, the encrypted media 134. For example, the media processing device 100 may be a computer, a laptop, a tablet, a smart phone, a media streaming device, a game console, a smart DVD player, or the like; while the media display device 200 may be a laptop, a tablet, a smart phone, or a smart TV. As a specific example, the media processing device 100 may be a media streaming device while the media display device 200 is a smart TV. Examples are not limited in this context.

In general, the device 100 and 200 may be communicatively coupled via the network 999. It is noted, the network 999 is depicted as a wireless network. However in some example, one or more of the connections to the network 999 may be wired. In general, the device 100 and 200 may be communicatively coupled to exchange data and/or information related to the processing of the encrypted media 134. In some examples, the devices 100 and/or 200 may exchange data (even unrelated data) with other devices not depicted. Furthermore, the devices 100 and/or 200 may be operably connected to additional network (e.g., the Internet, or the like) via the network 999 or another network not shown.

In various embodiments, the network 999 may be a single network possibly limited to extending within a single building or other relatively limited area, a combination of connected networks possibly extending a considerable distance, and/or may include the Internet. Thus, the network 999 may be based on any of a variety (or combination) of communications technologies by which signals may be exchanged, including without limitation, wired technologies employing electrically and/or optically conductive cabling, and wireless technologies employing infrared, radio frequency or other forms of wireless transmission. Accordingly, the interfaces 190, 290, and/or 490 may include circuitry providing at least some of the requisite functionality to enable such coupling. However, the interfaces 190, 290, and/or 490 may also be at least partially implemented with sequences of instructions executed by the processor elements (e.g., to implement a protocol stack or other features). Where one or more portions of the network 999 employs electrically and/or optically conductive cabling, the interface may employ signaling and/or protocols conforming to any of a variety of industry standards, including without limitation, RS-232C, RS-422, USB, Ethernet (IEEE-802.3) or IEEE-1394. Alternatively or additionally, where one or more portions of the network 999 entails the use of wireless signal transmission, corresponding ones of these interfaces may employ signaling and/or protocols conforming to any of a variety of industry standards, including without limitation, IEEE 802.11a, 802.11b, 802.11g, 802.16, 802.20 (commonly referred to as "Mobile Broadband Wireless Access"); Bluetooth; ZigBee; or a cellular radiotelephone service such as GSM with General Packet Radio Service (GSM/GPRS), CDMA/1xRTT, Enhanced Data Rates for Global Evolution (EDGE), Evolution Data Only/Optimized (EV-DO), Evolution For Data and Voice (EV-DV), High Speed Downlink Packet Access (HSDPA), High Speed Uplink Packet Access (HSUPA), 4G LTE, etc. It should be noted that although the interface is depicted as a single block, it might include multiple interfaces that may be based on differing signaling technologies. This may be the case especially where one or more of these interfaces couples the components to more than one network, each employing differing communications technologies.

With various examples, the device 100 incorporates one or more of processor element 112, graphics processing unit (GPU) 114, power management unit 120, computer-readable storage 130, trusted execution environment (TEE) 140, controls 160, an interface 170, and a transcription engine 180. The computer-readable storage 130 stores one or more of a control routine 132, DRM encrypted media 134, and PAVP encrypted media 136. The TEE 140 includes one or more of a control routine 142, encryption keys 144, power state transition information 146, and power state table 148.

The device 200 incorporates one or more of processor element 212, graphics processing unit (GPU) 214, power management unit 220, computer-readable storage 230, controls 260, an interface 270, decryption-decoder engine 285, and display 290. The computer-readable storage 230 stores one or more of a control routine 232 and PAVP encrypted media 136.

In various embodiments, the transcription engine 180 and decryption-decoder engine 285 may be logic (e.g., circuitry, computer executable instructions, and/or a combination of circuitry and instructions, or the like) to securely process the DRM encrypted media 134 and the PAVP encrypted media 136.

In various embodiments, the display 290 may be any of a variety of types of display devices including and not limited to a liquid crystal display (LCD), an electroluminescent (EL) display, a plasma display, etc. Further, it should be noted that the controls and the display might be combined into a single component such as a touchscreen display.

In general, the control routine 132 incorporates a sequence of instructions operative on the components of the device 100 (e.g., the processor element 112, the GPU 114, the power management unit 120, the interface 170, or the like) to implement logic to access and encode the DRM encrypted media 134 to generate the PAVP encrypted media 136. For example, the control routine 132 may cause the transcription engine 180 to decrypt, transcribe, and re-encrypt (e.g., with a platform specific key) the DRM encrypted media 134 as the PAVP encrypted media 136 for communication to the device 200.

In general, the control routine 232 incorporates a sequence of instructions operative on the components of the device 200 (e.g., the processor element 212, the GPU 214, the power management unit 220, the interface 170, the display 290, or the like) to implement logic to access, decrypt, decode, and display the PAVP encrypted media 136. For example, the control routine 232 may cause the decryption-decoder engine 285 to decrypt and decode the PAVP encrypted media 136 for display by the display 290.

The control routine 142 incorporates a sequence of instructions operative on the TEE 140 to implement logic to provision the encryption keys 144, receive power state information 146, determine the power state table 148, and/or re-provision the encryption keys 144 based on the power state table 148 and/or the power state information 146. In particular, the control routine 142 comprises instructions operative on the TEE 140 to cause the TEE to provision and/or re-provision the encryption keys 144 to the device 100 and the device 200 to provide access the encrypted media 134 and the encoded media 136.

In executing the control routine 132, the transcription engine 180 may receive the DRM encrypted media 134. For example, the transcription engine 180 may receive the DRM encrypted media 134 via the interface 170 or from a storage location (e.g., the computer-readable storage 130, another computer readable storage (not shown), or the like). Additionally, in executing the control routine 132, the transcription engine 180 may access the DRM encrypted media 134 and decrypt the DRM encrypted media using an encryption key provisioned by the TEE 140 (e.g., one of the encryption keys 144). Additionally, the transcription engine 180 may transcribe (e.g., into a platform specific encoding, or the like) the decrypted DRM encrypted media 134 and encrypt the transcribed media using another (e.g., platform specific, or the like) encryption key provisioned by the TEE 140. It is noted, that the transcription engine 180 may be provisioned a first encryption key to access the DRM encrypted media 134 and a second encryption key to encrypt the PAVP encrypted media 136 with. Accordingly, the device 100 may communicate the PAVP encrypted media 136 in a secure manner to the device 200 via the network 999.

In executing the control routine 232, the decryption-decoder engine 285 may receive the PAVP encrypted media 136. For example, the description-decoder engine 285 may receive the PAVP encrypted media 136 via the interface 270. Additionally, in executing the control routine 232, decryption-decoder engine 285 may access the PAVP encrypted media 136 to decrypt and decode the PAVP encrypted media 136 using an encryption key provisioned by the TEE 140 (e.g., one of the encryption keys 144).

In executing the control routine 142, the TEE 140 may be caused to provision the encryption keys 144 to one or more components of the system 1000 to facilitate accessing the DRM encrypted media 134, generating the PAVP encrypted media 136 and accessing the PAVP encrypted media 136. Additionally, in executing the control routine 142, the TEE 140 may receive power state information 146 from power management unit 120 and/or power management unit 220.

Turning more specifically to FIG. 4, aspects of the operation of the system 1000 are depicted in greater detail. In general, the control routine 132 is configured to access the DRM encrypted media 134 using the transcription engine 180. The encrypted media-processing component 1321 receives one or more encryption keys of the encryption keys 144 from the TEE 140 via secure Out-of-Band (OOB) channel 210-1. Additionally, the encryption processor 1321 is configured to cause the device 100 to access (e.g., decrypt and transcribe, and encrypt) the DRM encrypted media 134, thereby generating the PAVP encrypted media 136. In some examples, the encrypted media-processing component 1321 sends a control signal to the transcription engine 180 include an indication to decrypt the DRM encrypted media 134 with the one of the provisioned encryption keys 144 to transcribe the decrypted media and to encrypt the transcribed media as PAVP encrypted media 136 using another one (or the same) of the provisioned encryption keys 144.

In general, the control routine 232 is configured to "access" (e.g., decode, play, display, or the like) the PAVP encrypted media 136 using the decryption-decoder engine 285. The encrypted media-processing component 2321 receives one or more encryption keys of the encryption keys 144 from the TEE 140 via secure Out-of-Band (OOB) channel 210-3. Additionally, the encrypted media-processing component 2321 is configured to cause the device 200 to decrypt and decode the PAVP encrypted media 136 for display by the display 290. In some examples, the encrypted media-processing component 2321 sends a control signal to the decryption-decoder engine 285 to include an indication to decrypt the PAVP encrypted media 136 with the provisioned one of the encryption keys 144 and decode the decrypted media.

During operation, the hardware components of the system 1000 may asynchronously transition between power states. For example, the transcription engine 180 and decryption-decoder engine 285 may asynchronously transition between power states. As a result, provisioned encryption keys may be lost as described above. For example, the decryption-decoder engine 285 may transition from an active power state and back to the active power state thereby losing the encryption key needed to decrypt and decode the PAVP encrypted media 136. As such, continued decryption and decoding of the PAVP encrypted media 136 may result in or be manifest as glitches in the media output due to the lack of the correct encryption key.

The TEE 140 may be configured to both provision and re-provision encryption keys based on power state transitions to reduce glitches in playback of encrypted media within the system 1000. The control routine 142 may comprise the encryption key manger 1421 and a glitch avoidance manager 1422. The encryption key manager 1421 may be configured to provision the encryption key 144 to the encrypted media-processing component 1321 as described above. In particular, the encryption key manager 1421 may be configured to provision the encryption key 144 to the encrypted media-processing component 1321 via the secure OOB channel 210-1.

The glitch avoidance manager (GAM) 1422 may be configured to receive power state transition information 146 from the power management unit 120 and the power management unit 220 via the secure OOB channels 210-2 and 210-4, respectably. The GAM 1422 may generate and/or update the power state table 148 to include an indication of the power states, power state transitions, and/or provisioned encryption keys corresponding to the transcription engine 180 and the decryption-decoder engine 285. Accordingly, the GAM 1422 may determine to re-provision one of the encryption keys 144 to the encrypted media-processing component 1321 and/or 2321 based on receiving power state transition information 146 including an indication that one of the transcription engine 180 and/or decryption-decoder engine 285 is to and did have a power state transition where the provisioned encryption key may be lost.

In some examples, the GAM 1422 may determine which encryption key was previously provisioned and re-provision this same encryption key. With some examples, the GAM 1422 may send a control signal to the encryption key manager 1421 to cause the encryption key manager 1421 to re-provision the identified one of the encryption keys 144.

In some examples, the GAM 1422 may be configured to determine when one of the encryption keys 144 is to change. For example, in some implementations, a content provider (e.g., data stream provider, or the like) may repeatedly change the encryption key (e.g., the encryption key to decrypt the DRM encrypted media 134, or the like). Accordingly, the control routine 142, and particularly the encryption key manager 1421 may be configured to determine an updated encryption key or determine a schedule for updating the encryption keys. As such, the encryption key manager 1421 may provide the correct encryption key 144 to the GAM 1421 to re-provision (or initially provision) to components of the system 1000.

As a particularly illustrative example, the transcription engine 180 may change power states, thereby losing the provisioned encryption key. At a substantially similar time, a content provider may change the encryption key 144 to decrypt the DRM encrypted media 134. The control routine 142 may be configured to determine the updated encryption key (e.g., from the content stream provider, or the like) to provision to the transition engine 180 to resume processing the DRM encrypted media 134.

Figure 5:
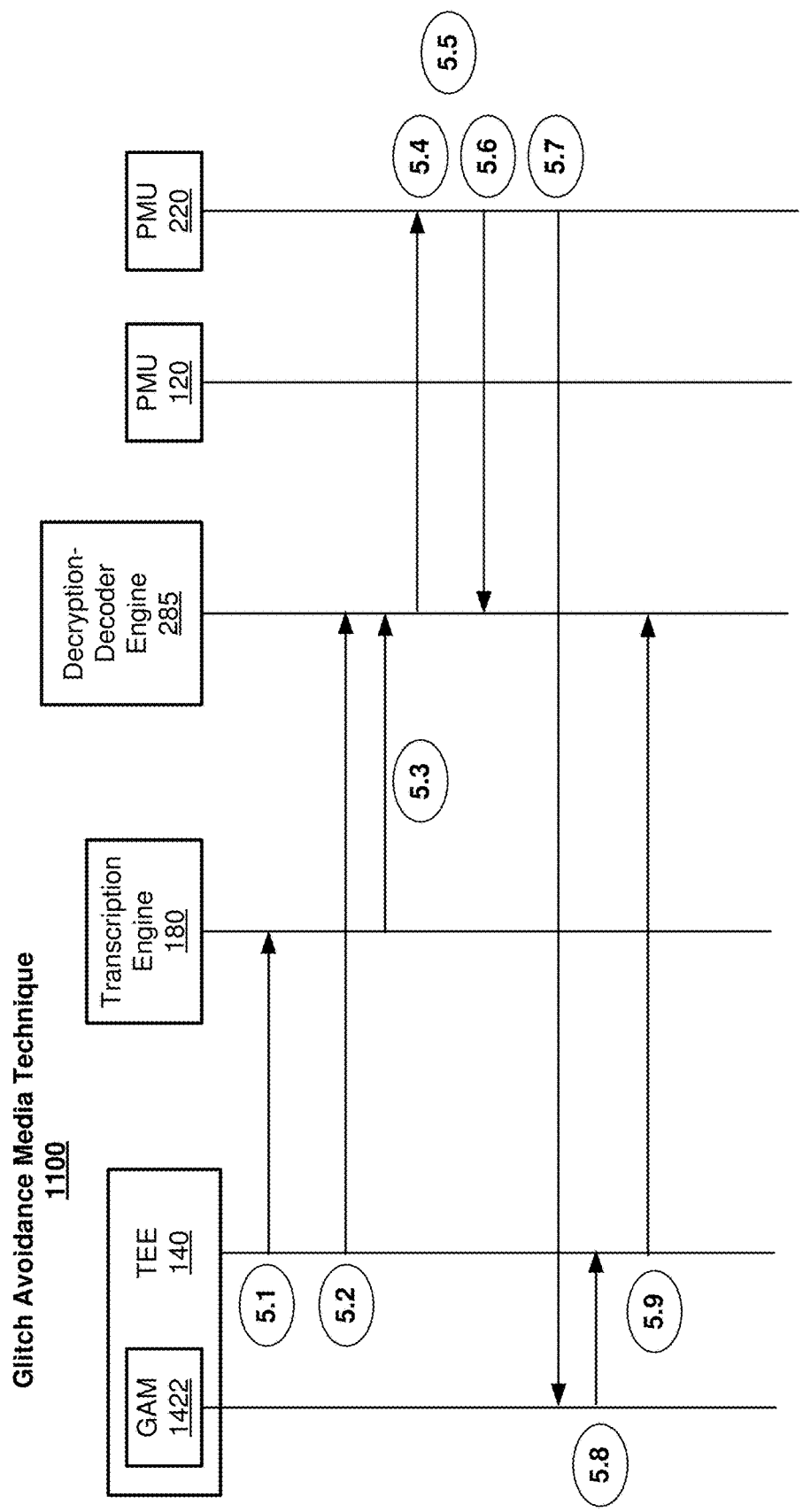
FIG. 5 illustrates a technique according to an embodiment.

FIG. 5 illustrates a technique 1100 for provisioning and re-provisioning encryption keys that may be implemented according to various embodiments of the present disclosure. As depicted, the technique 1100 includes operations or blocks 5.A, where A is a positive integer. Furthermore, the technique 1100 is described with reference to the system 1000 of FIGS. 3-4. However this is not limiting.

Beginning at block 5.1, the TEE 140 may provision at least a first one of the encryption keys 144 to the transcription engine 180. Continuing to block 5.2, the TEE 140 may provision at least a second one of the encryption keys 144 to the decryption-decoder engine 285. In some examples, the TEE 140 may provision the same key to both the transcription engine 180 and the decryption-decoder engine 285. Continuing to block 5.3, the transcription engine 180 may decrypt, transcribe, and/or encrypt the DRM encrypted media 134 as the PAVP encrypted media 136 for communication to the decryption-decoder engine 285 while the decryption-decoder engine 285 may decrypt and decode the received PAVP encrypted media 136 (e.g., for output, for display, or the like).

Continuing to block 5.4, the decryption-decoder engine 285 may transition from an active power state to a power gated state (e.g., from D0*i*0 to D0*i*3, or the like). It is important to note, that the power management unit 220 may identify the transition and/or the power management unit 220 may even control the transition. Continuing to block 5.5, due to the transition to a power gated state, the decryption-decoder engine 285 will lose the provisioned encryption key. More specifically, the encryption key provisioned at block 5.2 will be lost. Continuing to block 5.6, the decryption-decoder engine 285 may transition back to the active power state (e.g., from D0*i*3 to D0*i*0, or the like). It is important to note, that the power management unit 220 may identify the transition and/or the power management unit 220 may even control the transition.

It is important to note, that the example power state transition shown in FIG. 5 is given for example only, and not intended to be limiting. In particular, the present disclosure can be implemented to re-provision encryption key(s) for power state transitions for any components of the system to which encryption key(s) have been provisioned, for example, the processor element 112, the transition engine 180, an encoder, a decoder, a display, a video processor, the decryption-decoder engine 285, or the like.

Continuing to block 5.7, the power management unit 220 may communicate the power state transition information to the glitch avoidance manger 1422. In particular, the power management unit 220 may communicate power state transition information 146 to include an indication the decoder transitioned (or will transition) from an active power state to a power gated state and back to the active power state, and as such, will lose the provisioned encryption key (e.g., as block 5.5). It is important to note, that blocks 5.4, 5.5, and 5.6 may occur before or after block 5.7. For example, the power management unit 220 may communicate power state transition information to the glitch avoidance manager 1422 to include an indication of an upcoming power state transition that may cause a component (e.g., the decoder) to lose provisioned keys.

Continuing to block 5.8, the glitch avoidance manger 1422 may send a control signal to the TEE (e.g., the encryption key manager 1421 depicted in FIG. 4, or the like) to cause the TEE to re-provision the lost encryption key. Continuing to block 5.9, the TEE 140 may re-provision the lost encryption key. In particular, the TEE 140 may re-provision the key provisioned at block 5.2. It is important to note, that the glitch avoidance manager 1422 and the TEE 140 may anticipate lost encryption keys as described above. More specifically, the power management units (e.g., the power management unit 220, or the like) may communicate upcoming power state transition such that the TEE 140 may re-provision lost encryption keys when the components (e.g., the decoder 285, or the like) return to the active state.

Figure 6:
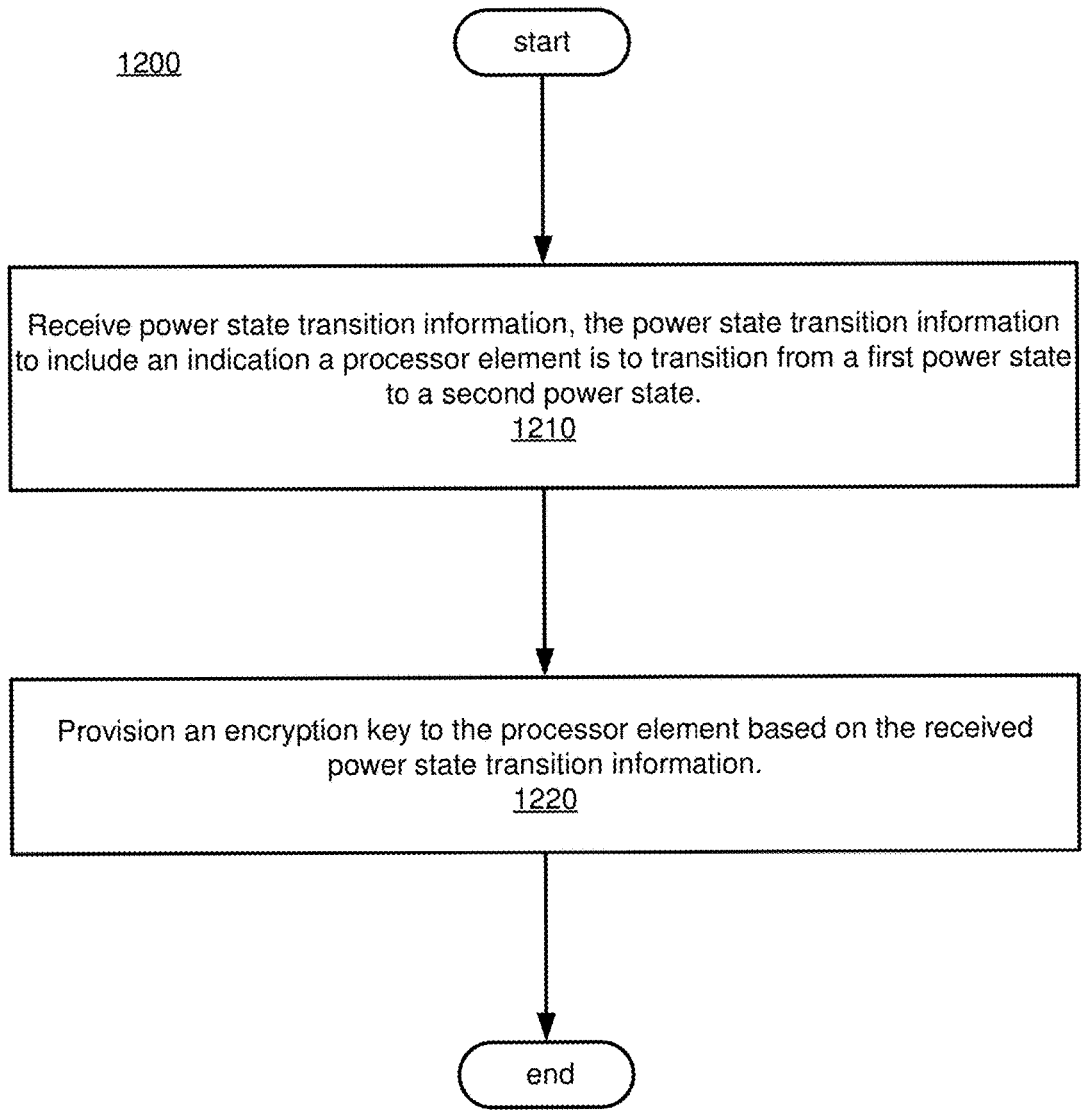
FIGS. 6-7 each illustrate logic flows according to various embodiments.
Figure 7:
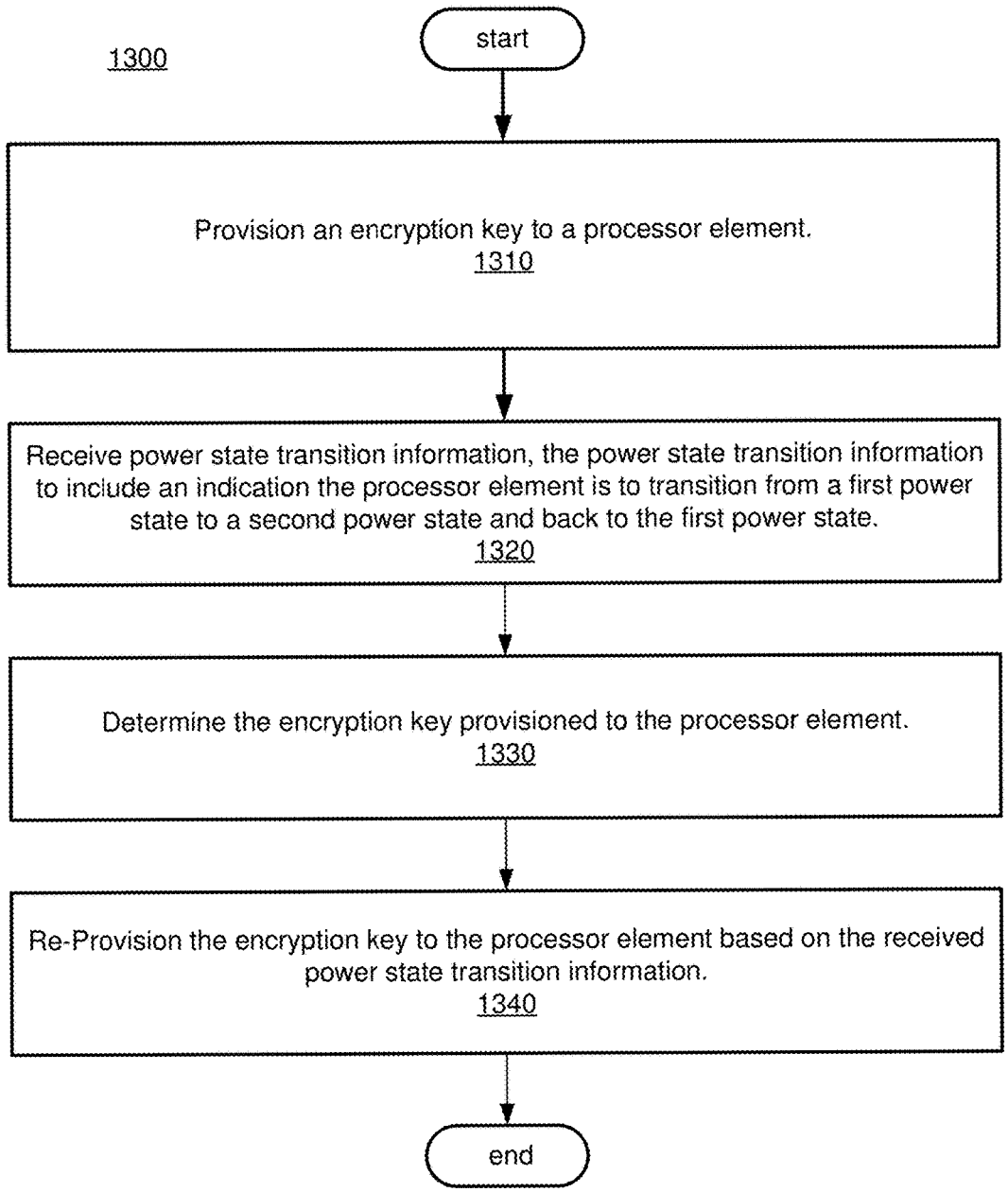

FIGS. 6-7 illustrate embodiments of logic flows for provisioning encryption keys to access encrypted media. For example, the logic flows may be implemented to provisioning encryption keys to the processor element 112, the GPU 114, the transcription engine 180, and/or the decryption-decoder engine 285 to facilitate access to the DRM encrypted media 134 and/or the PAVP encrypted media 136. It is to be appreciated, that the logic flows are described with reference to FIGS. 1-4 and the device 100, the device 200, and/or the system 1000. However, examples are not limited in this context and in particular, systems and/or devices including similar or different component to those depicted in FIGS. 1-4 may implement the logic flows.

Turning more specifically to FIG. 6, the logic flow 1200 may begin at block 1210. At block 1210, "receive power state transition information, the power state transition information to include an indication a processor element is to transition from a first power state to a second power state," the control routine 142 may receive the power state transition information 146. For example, the GAM 1422 may receive the power state transition information 146 from the power management unit 120 (e.g., via the secure OOB channel 210-2, the secure OOB channel 210-4, or the like). In some examples, the power state transition information 146 may include an indication that a processor element (e.g., the processor element 112, the GPU 114, the transcription engine 180, and/or the decryption-decoder engine 285, or the like) is to transition from a first power state to a second power state (e.g., from D0$i$3 to D0$i$0, or the like).

Continuing to block 1220, "provision an encryption key to the processor element based on the received power state transition information," the control routine 142 may provision the encryption key 144 (or one of the encryption keys 144) to the processor element. For example, the encryption key manager 1421 may provision one of the encryption keys 144 to the processor element based on the received power state transition information 146. With some examples, the encryption key manager 1421 may receive a control signal from the GAM 1422, the control signal to include an indication to provision one of the encryption keys (in some examples, a specific one of the encryption keys) to the processor element.

Turning more specifically to FIG. 7, the logic flow 1300 is depicted. The logic flow 1300 may begin at block 1310. At block 1310, "provision an encryption key to a processor element," the control routine 142 may provision the encryption key 144 (or one of the encryption keys 144) to the processor element. For example, the encryption key manager 1421 may provision one of the encryption keys 144 to the processor element.

Continuing to block 1320, "receive power state transition information, the power state transition information to include an indication a processor element is to transition from a first power state to a second power state and back to the first power state," the control routine 142 may receive the power state transition information 146. For example, the GAM 1422 may receive the power state transition information 146 from the power management unit 120 (e.g., via the secure OOB channel 210-2, the secure OOB channel 210-4, or the like). In some examples, the power state transition information 146 may include an indication that a processor element (e.g., the processor element 112, the GPU 114, the transcription engine 180, and/or the decryption-decoder engine 285, or the like) is to transition from a first power state to a second power state and back to the first power state (e.g., from D0$i$0 to D0$i$3 and back to D0$i$0, or the like).

Continuing to block 1330, "determine the encryption key provisioned to the processor element," the control routine 142 may determine the encryption key provisioned to the processor element. For example, the GAM 1422 may determine the encryption key provisioned to the processor element at block 1810. In some examples, the GAM 1422 may determine the provisioned encryption key based on the powers state table 148.

Continuing to block 1340, "re-provision an encryption key to a processor element based on the received power state transition information," the control routine 142 may re-provision the encryption key 144 (or one of the encryption keys 144) to the processor element based on the received power state transition information 146. For example, the encryption key manager 1421 may re-provision one of the encryption keys 144 to the processor element based on receiving a control signal from the GAM 1422. In some examples, the GAM 1422 may send a control signal to the encryption key manager 1421 to include an indication to re-provision the encryption key when the processor element transition back to the first power state (e.g., D0$i$0, or the like).

Figure 8:
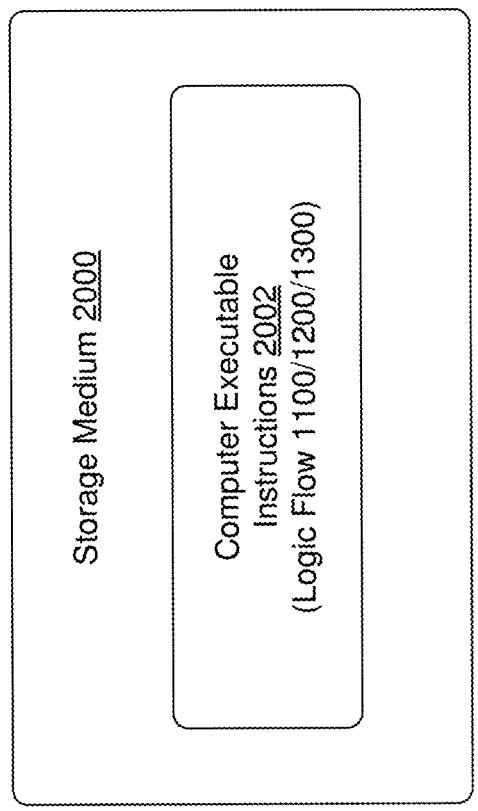
FIG. 8 illustrates an embodiment of computer-readable storage medium.

FIG. 8 illustrates an embodiment of a storage medium 2000. The storage medium 2000 may comprise an article of manufacture. In some examples, the storage medium 2000 may include any non-transitory computer readable medium or machine readable medium, such as an optical, magnetic or semiconductor storage. The storage medium 2000 may store various types of computer executable instructions e.g., 2002). For example, the storage medium 2000 may store various types of computer executable instructions to implement logic flow 1100. In some examples, the storage medium 2000 may store various types of computer executable instructions to implement logic flow 1200. In some examples, the storage medium 2000 may store various types of computer executable instructions to implement logic flow 1300.

Examples of a computer readable or machine readable storage medium may include any tangible media capable of storing electronic data, including volatile memory or non-volatile memory, removable or non-removable memory, erasable or non-erasable memory, writeable or re-writeable memory, and so forth. Examples of computer executable instructions may include any suitable type of code, such as source code, compiled code, interpreted code, executable code, static code, dynamic code, object-oriented code, visual code, and the like. The examples are not limited in this context.

Figure 9:
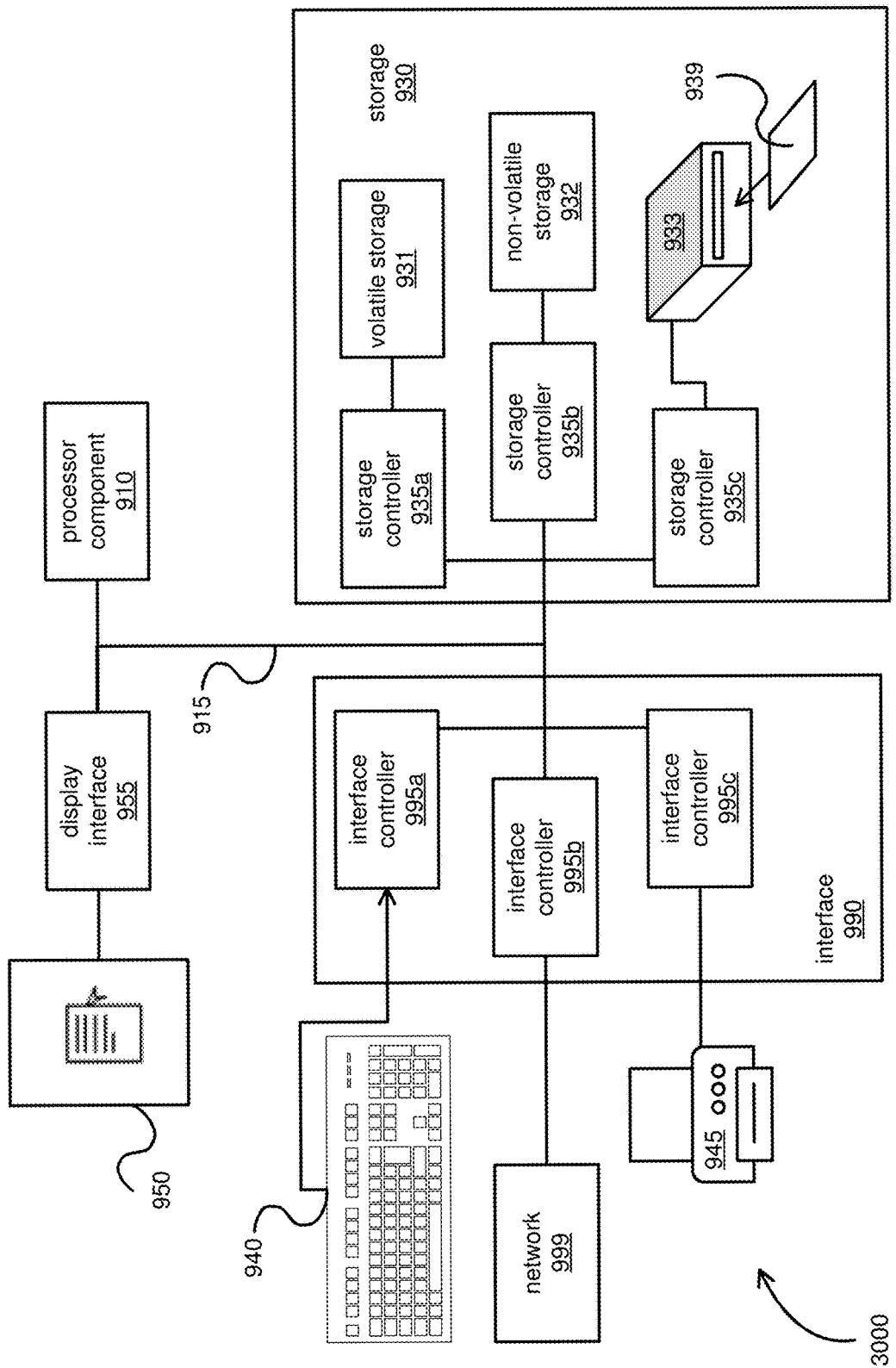
FIG. 9 illustrates an embodiment of a processing architecture.

FIG. 9 illustrates an embodiment of an exemplary processing architecture 3000 suitable for implementing various embodiments as previously described. More specifically, the processing architecture 3000 (or variants thereof) may be implemented as part of the system 1000 of FIGS. 3-4, the device 100 of FIGS. 1-4, and/or the device of FIGS. 3-4.

The processing architecture 3000 includes various elements commonly employed in digital processing, including without limitation, one or more processors, multi-core processors, co-processors, memory units, chipsets, controllers, peripherals, interfaces, oscillators, timing devices, video cards, audio cards, multimedia input/output (I/O) components, power supplies, etc. As used in this application, the terms "system" and "component" are intended to refer to an entity of a computing device in which digital processing is carried out, that entity being hardware, a combination of hardware and software, software, or software in execution, examples of which are provided by this depicted exemplary processing architecture. For example, a component can be, but is not limited to being, a process running on a processor element, the processor element itself, a storage device (e.g., a hard disk drive, multiple storage drives in an array, etc.) that may employ an optical and/or magnetic storage medium, an software object, an executable sequence of instructions, a thread of execution, a program, and/or an entire computing device (e.g., an entire computer). By way of illustration, both an application running on a server and the server can be a component. One or more components can reside within a process and/or thread of execution, and a component can be localized on one computing device and/or distributed between two or more computing devices. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to one or more signal lines. Each message may be a signal or a plurality of signals transmitted either serially or substantially in parallel.

As depicted, in implementing the processing architecture 3000, a computing device incorporates at least a processor element 910, a storage 930, an interface 990 to other devices, and coupling 915. Depending on various aspects of a computing device implementing the processing architecture 3000, including its intended use and/or conditions of use, such a computing device may further incorporate additional components, such as without limitation, a counter element 915.

The coupling 915 incorporates one or more buses, point-to-point interconnects, transceivers, buffers, crosspoint switches, and/or other conductors and/or logic that communicatively couples at least the processor element 910 to the storage 930. The coupling 915 may further couple the processor element 910 to one or more of the interface 990 and the display interface 955 (depending on which of these and/or other components are also present). With the processor element 910 being so coupled by couplings 915, the processor element 910 is able to perform the various ones of the tasks described at length, above, for whichever ones of the computing devices 100, 300 and 600 implement the processing architecture 3000. The coupling 915 may be implemented with any of a variety of technologies or combinations of technologies by which signals are optically and/or electrically conveyed. Further, at least portions of couplings 915 may employ timings and/or protocols conforming to any of a wide variety of industry standards, including without limitation, Accelerated Graphics Port (AGP), CardBus, Extended Industry Standard Architecture (E-ISA), Micro Channel Architecture (MCA), NuBus, Peripheral Component Interconnect (Extended) (PCI-X), PCI Express (PCI-E), Personal Computer Memory Card International Association (PCMCIA) bus, HyperTransport™, QuickPath, and the like.

As previously discussed, the processor element 910 may include any of a wide variety of commercially available processors, employing any of a wide variety of technologies and implemented with one or more cores physically combined in any of a number of ways.

As previously discussed, the storage 930 may include one or more distinct storage devices based on any of a wide variety of technologies or combinations of technologies. More specifically, as depicted, the storage 930 may include one or more of a volatile storage 931 (e.g., solid state storage based on one or more forms of RAM technology), a non-volatile storage 932 (e.g., solid state, ferromagnetic or other storage not requiring a constant provision of electric power to preserve their contents), and a removable media storage 933 (e.g., removable disc or solid state memory card storage by which information may be conveyed between computing devices). This depiction of the storage 930 as possibly comprising multiple distinct types of storage is in recognition of the commonplace use of more than one type of storage device in computing devices in which one type provides relatively rapid reading and writing capabilities enabling more rapid manipulation of data by the processor element 910 (but possibly using a "volatile" technology constantly requiring electric power) while another type provides relatively high density of non-volatile storage (but likely provides relatively slow reading and writing capabilities).

Given the often different characteristics of different storage devices employing different technologies, it is also commonplace for such different storage devices to be coupled to other portions of a computing device through different storage controllers coupled to their differing storage devices through different interfaces. By way of example, where the volatile storage 931 is present and is based on RAM technology, the volatile storage 931 may be communicatively coupled to coupling 915 through a storage controller 935a providing an appropriate interface to the volatile storage 931 that perhaps employs row and column addressing, and where the storage controller 935a may perform row refreshing and/or other maintenance tasks to aid in preserving information stored within the volatile storage 931. By way of another example, where the non-volatile storage 932 is present and includes one or more ferromagnetic and/or solid-state disk drives, the non-volatile storage 932 may be communicatively coupled to coupling 915 through a storage controller 935b providing an appropriate interface to the non-volatile storage 932 that perhaps employs addressing of blocks of information and/or of cylinders and sectors. By way of still another example, where the removable media storage 933 is present and includes one or more optical and/or solid-state disk drives employing one or more pieces of removable machine-readable storage media 939, the removable media storage 933 may be communicatively coupled to coupling 915 through a storage controller 935c providing an appropriate interface to the removable media storage 933 that perhaps employs addressing of blocks of information, and where the storage controller 935c may coordinate read, erase and write operations in a manner specific to extending the lifespan of the machine-readable storage media 939.

One or the other of the volatile storage 931 or the non-volatile storage 932 may include an article of manufacture in the form of a machine-readable storage media on which a routine comprising a sequence of instructions executable by the processor element 910 may be stored, depending on the technologies on which each is based. By way of example, where the non-volatile storage 932 includes ferromagnetic-based disk drives (e.g., so-called "hard drives"), each such disk drive typically employs one or more rotating platters on which a coating of magnetically responsive particles is deposited and magnetically oriented in various patterns to store information, such as a sequence of instructions, in a manner akin to removable storage media such as a floppy diskette. By way of another example, the non-volatile storage 932 may be made up of banks of solid-state storage devices to store information, such as sequences of instructions, in a manner akin to a compact flash card. Again, it is commonplace to employ differing types of storage devices in a computing device at different times to store executable routines and/or data. Thus, a routine comprising a sequence of instructions to be executed by the processor element 910 may initially be stored on the machine-readable storage media 939, and the removable media storage 933 may be subsequently employed in copying that routine to the non-volatile storage 932 for longer term storage not requiring the continuing presence of the machine-readable storage media 939 and/or the volatile storage 931 to enable more rapid access by the processor element 910 as that routine is executed.

As previously discussed, the interface 990 may employ any of a variety of signaling technologies corresponding to any of a variety of communications technologies that may be employed to communicatively couple a computing device to one or more other devices. Again, one or both of various forms of wired or wireless signaling may be employed to enable the processor element 910 to interact with input/output devices (e.g., the depicted example keyboard 940 or printer 945) and/or other computing devices, possibly through a network (e.g., the network 999) or an interconnected set of networks. In recognition of the often greatly different character of multiple types of signaling and/or protocols that must often be supported by any one computing device, the interface 990 is depicted as comprising multiple different interface controllers 995a, 995b and 995c. The interface controller 995a may employ any of a variety of types of wired digital serial interface or radio frequency wireless interface to receive serially transmitted messages from user input devices, such as the depicted keyboard 940. The interface controller 995b may employ any of a variety of cabling-based or wireless signaling, timings and/or protocols to access other computing devices through the depicted network 999 (perhaps a network comprising one or more links, smaller networks, or perhaps the Internet). The interface 995c may employ any of a variety of electrically conductive cabling enabling the use of either serial or parallel signal transmission to convey data to the depicted printer 945. Other examples of devices that may be communicatively coupled through one or more interface controllers of the interface 990 include, without limitation, microphones, remote controls, stylus pens, card readers, finger print readers, virtual reality interaction gloves, graphical input tablets, joysticks, other keyboards, retina scanners, the touch input component of touch screens, trackballs, various sensors, laser printers, inkjet printers, mechanical robots, milling machines, etc.

Where a computing device is communicatively coupled to (or perhaps, actually incorporates) a display (e.g., the depicted example display 950), such a computing device implementing the processing architecture 3000 may also incorporate the display interface 955. Although more generalized types of interface may be employed in communicatively coupling to a display, the somewhat specialized additional processing often required in visually displaying various forms of content on a display, as well as the somewhat specialized nature of the cabling-based interfaces used, often makes the provision of a distinct display interface desirable. Wired and/or wireless signaling technologies that may be employed by the display interface 955 in a communicative coupling of the display 950 may make use of signaling and/or protocols that conform to any of a variety of industry standards, including without limitation, any of a variety of analog video interfaces, Digital Video Interface (DVI), DisplayPort, etc.

More generally, the various elements of the computing devices 100, 200, and 400 may include various hardware elements, software elements, or a combination of both. Examples of hardware elements may include devices, logic devices, components, processors, microprocessors, circuits, processor elements, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. However, determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Further, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims. The disclosure now turns to providing various examples implementations.

Example 1

An apparatus to provision encryption keys, the apparatus comprising: a processor element; first logic executable by the processor element, the first logic to receive an encryption key to access an encrypted media; a trusted execution environment (TEE); and second logic executable by the TEE, the second logic to: receive power state transition information, the power state transition information to include an indication the processor element is to transition from a first power state to a second power state; and provision the encryption key to the first logic based on the received power state transition information.

Example 2

The apparatus of example 1, the second logic to store the encryption key and the power state of the processor element in a power state table.

Example 3

The apparatus of example 2, the second logic to: receive power state transition information, the power state transition information to include an indication the processor element is to transition from the second power state to the first power state and back to the second power state; determine the encryption key provisioned to the processor element based in part on the power state table; and re-provision the encryption key to the first logic based on the received power state transition information.

Example 4

The apparatus of example 1, comprising a power management unit, the second logic to receive the power state transition information from the power management unit.

Example 5

The apparatus of example 1, the processor element a first processor element and the encryption key a first encryption key, the apparatus comprising: a second processor element; and third logic executable by the second processor element, the third logic to receive a second encryption key to access the encrypted media; the second logic to: receive power state transition information, the power state transition information to include an indication the second processor element is to transition from a third power state to a fourth power state; and provision the second encryption key to the second logic based on the received power state transition information.

Example 6

The apparatus of example 1, the second logic to provision the encryption key to the first logic via a secure out-of-bound (OOB) channel.

Example 7

The apparatus of example 4, the second logic to receive the power state information from the power management unit via a secure out-of-bound (OOB) channel.

Example 8

The apparatus of either of examples 6 or 7, the secure OOB channel to comprise a data path protector.

Example 9

The apparatus of example 1, the TEE to comprise a secure processing element and a secure computer readable storage.

Example 10

The apparatus of example 1, the processor element comprising a processor element for a graphics processor, a display, a media encoder, or a media decoder.

Example 11

The apparatus of example 5, wherein the first encryption key and the second encryption key are the same.

Example 12

The apparatus of example 1, the second logic to provision the encryption key to the first logic after the first logic before the processor element transitions from the first power state to the second power state.

Example 13

The apparatus of example 1, the second logic to provision the encryption key to the first logic before the first logic before the processor element transitions from the first power state to the second power state.

Example 14

An apparatus to provision encryption keys, the apparatus comprising: a trusted execution environment (TEE); a glitch avoidance manager (GAM) executable by the TEE, the GAM to receive power state transition information, the power state transition information to include an indication a processor element is to transition from a first power state to a second power state; and an encryption key manager executable by the TEE, the encryption key manager to provision an encryption key to a processor element based on the received power state transition information, the encryption key to access encrypted media.

Example 15

The apparatus of example 14, the GAM to store the encryption key and the power state of the processor element in a power state table.

Example 16

The apparatus of example 15, the GAM to: receive power state transition information, the power state transition information to include an indication the processor element is to transition from the second power state to the first power state and back to the second power state; determine the encryption key provisioned to the processor element based in part on the power state table; and send a control signal the encryption key manager to cause the encryption key manager to re-provision the encryption key to the processor element based on the received power state transition information.

Example 17

The apparatus of example 14, the GAM to receive the power state transition information from a power management unit, the power management unit operably coupled to the processor element.

Example 18

The apparatus of example 14, the encryption key manager to provision the encryption key to the processor element via a secure out-of-bound (OOB) channel.

Example 19

The apparatus of example 17, the GAM to receive the power state information from the power management unit via a secure out-of-bound (OOB) channel.

Example 20

The apparatus of either of examples 18 or 19, the secure OOB channel to comprise a data path protector.

Example 21

The apparatus of example 14, the encryption key manager to provision the encryption key to the processor element via a wireless network.

Example 22

The apparatus of example 14, the TEE to comprise a secure processing element and a secure computer readable storage.

Example 23

At least one machine-readable storage medium comprising instructions that when executed by computing device, cause the computing device to: receive power state transition information, the power state transition information to include an indication a processor element is to transition from a first power state to a second power state; and provision an encryption key to the processor element based on the received power state transition information.

Example 24

The at least one machine-readable storage medium of example 23, the computing device caused to store the encryption key and the power state of the processor element in a power state table.

Example 25

The at least one machine-readable storage medium of example 24, the computing device caused to: receive power state transition information, the power state transition information to include an indication the processor element is to transition from the second power state to the first power state and back to the second power state; determine the encryption key provisioned to the processor element based in part on the power state table; and re-provision the encryption key to the processor element based on the received power state transition information.

Example 26

The at least one machine-readable storage medium of example 23, the computing device caused to receive the power state transition information from a power management unit.

Example 27

The at least one machine-readable storage medium of example 23, the processor element a first processor element and the encryption key a first encryption key, the computing device caused to: receive power state transition information, the power state transition information to include an indication a second processor element is to transition from a third power state to a fourth power state; and provision a second encryption key to the second processor element on the received power state transition information.

Example 28

The at least one machine-readable storage medium of example 23, the computing device caused to provision the encryption key to the processor element via a secure out-of-bound (OOB) channel.

Example 29

The at least one machine-readable storage medium of example 26, the computing device caused to receive the power state information from the power management unit via a secure out-of-bound (OOB) channel.

Example 30

The at least one machine-readable storage medium of either of examples 27 to 29, the secure OOB channel to comprise a data path protector.

Example 31

The at least one machine-readable storage medium of example 23, the computing device to comprise a secure processing element and a secure computer readable storage.

Example 32

The at least one machine-readable storage medium of example 23, the processor element to comprise a processor element for a graphics processor, a display, a media encoder, or a media decoder.

Example 33

The at least one machine-readable storage medium of example 27, wherein the first encryption key and the second encryption key are the same.

Example 34

A computer-implemented method comprising: receiving power state transition information, the power state transition information to include an indication a processor element is to transition from a first power state to a second power state; and provisioning an encryption key to the processor element based on the received power state transition information.

Example 35

The computer-implemented method of example 34, comprising storing the encryption key and the power state of the processor element in a power state table.

Example 36

The computer-implemented method of example 35, comprising: receiving power state transition information, the power state transition information to include an indication the processor element is to transition from the second power state to the first power state and back to the second power state; determining the encryption key provisioned to the processor element based in part on the power state table; and re-provisioning the encryption key to the processor element based on the received power state transition information.

Example 37

The computer-implemented method of example 34, comprising receiving the power state transition information from a power management unit.

Example 38

The computer-implemented method of example 34, the processor element a first processor element and the encryption key a first encryption key, the method comprising: receiving power state transition information, the power state transition information to include an indication a second processor element is to transition from a third power state to a fourth power state; and provisioning a second encryption key to the second processor element on the received power state transition information.

Example 39

The computer-implemented method of example 34, comprising provisioning the encryption key to the processor element via a secure out-of-bound (OOB) channel.

Example 40

The computer-implemented method of example 37, comprising receiving the power state information from the power management unit via a secure out-of-bound (OOB) channel.

Example 41

The computer-implemented method of either one of example 39 to 40, the secure OOB channel to comprise a data path protector.

Example 42

The computer-implemented method of example 34, the processor element to comprise a processor element for a graphics processor, a display, a media encoder, or a media decoder.

Example 43

The computer-implemented method of example 37, wherein the first encryption key and the second encryption key are the same.

Example 44

An apparatus for a device, the apparatus comprising means for performing the method of any one of examples 34 to 43.

The invention claimed is:

1. An apparatus to provision encryption keys, the apparatus comprising:
a processor element comprised in hardware;
first logic for execution by a portion of the processor element, the first logic to receive an encryption key to access an encrypted media;
a trusted execution environment (TEE); and
second logic comprising a glitch avoidance manager (GAM) for execution by the TEE, the second logic to:
receive power state transition information with the GAM via a first secure out-of-band (OOB) channel, the power state transition information to include an indication the portion of the processor element that executes the first logic is to transition from a first power state to a second power state, the portion of the processor element utilized by the first logic to access the encrypted media with the encryption key; and
provision the encryption key to the first logic via a second secure OOB channel based on the received power state transition information.

2. The apparatus of claim 1, the second logic to store the encryption key and the power state of the processor element in a power state table.

3. The apparatus of claim 2, the second logic to:
receive power state transition information via the first secure OOB channel, the power state transition information to include an indication a portion of the processor element is to transition from the second power state to the first power state and back to the second power state;
determine the encryption key provisioned to the processor element based in part on the power state table; and
re-provision the encryption key to the first logic based on the received power state transition information.

4. The apparatus of claim 1, comprising a power management unit, the second logic to receive the power state transition information from the power management unit via the first secure OOB channel.

5. The apparatus of claim 1, the processor element a first processor element and the encryption key a first encryption key, the apparatus comprising:
a second processor element; and
third logic executable by the second processor element, the third logic to receive a second encryption key to access the encrypted media;
the second logic to:
receive power state transition information, the power state transition information to include an indication the second processor element is to transition from a third power state to a fourth power state; and
provision the second encryption key to the second logic based on the received power state transition information.

6. The apparatus of claim 1, the first or second secure OOB channel to comprise a dedicated protected data bus or a data path protector.

7. The apparatus of claim 1, the second logic to provision the encryption key to the first logic before the processor element transitions from the first power state to the second power state.

8. The apparatus of claim 1, the TEE to comprise a secure processing element and a secure computer readable storage.

9. The apparatus of claim 1, the processor element comprising a processor element for a graphics processor, a display, a media encoder, or a media decoder.

10. The apparatus of claim 5, wherein the first encryption key and the second encryption key are the same.

11. The apparatus of claim 1, the processor element to include a first portion and a second portion, the second portion to comprise a secure portion of the processor element, the first logic executable by the first portion of the processor element and the TEE to include the second portion of the processor element, the second logic executable by the second portion of the processor element.

12. An apparatus to provision encryption keys, the apparatus comprising:
a trusted execution environment (TEE) comprising a secure portion of a first processor element comprised in hardware, the TEE to include:
a glitch avoidance manager (GAM) for execution by the secure portion of the first processor element of the TEE, the GAM to receive power state transition information via a first secure out-of-band (OOB) channel, the power state transition information to include an indication a second processor element is to transition from a first power state to a second power state, the second processor element utilized to access the encrypted media with an encryption key; and
an encryption key manager for execution by the secure portion of the first processor element of the TEE, the encryption key manager to provision the encryption key to the second processor element via a second secure OOB channel based on the received power state transition information.

13. The apparatus of claim 12, the GAM to:
receive power state transition information, the power state transition information to include an indication the second processor element is to transition from the second power state to the first power state and back to the second power state;
determine the encryption key provisioned to the second processor element; and
send a control signal the encryption key manager to cause the encryption key manager to re-provision the encryption key to the second processor element based on the received power state transition information.

14. The apparatus of claim 12, the GAM to receive the power state transition information from a power management unit via the first secure OOB channel, the power management unit operably coupled to the second processor element.

15. At least one non-transitory machine-readable storage medium comprising instructions that when executed by a computing device, cause the computing device to:
receive power state transition information via a first secure out-of-band (OOB) channel at a glitch avoidance manager (GAM) within a trusted execution environment (TEE) comprised in hardware, the power state transition information to include an indication a processor element comprised in hardware external to the TEE is to transition from a first power state to a second power state, the processor element utilized to access encrypted media with an encryption key; and
provision the encryption key to the processor element via a second secure OOB channel based on the received power state transition information.

16. The at least one non-transitory machine-readable storage medium of claim 15, the computing device caused to store the encryption key and the power state of the processor element in a power state table.

17. The at least one non-transitory machine-readable storage medium of claim 16, the computing device caused to:
receive power state transition information, the power state transition information to include an indication the processor element is to transition from the second power state to the first power state and back to the second power state;
determine the encryption key provisioned to the processor element based in part on the power state table; and
re-provision the encryption key to the processor element based on the received power state transition information.

18. The at least one non-transitory machine-readable storage medium of claim 15, the computing device caused to receive the power state transition information from a power management unit via the first secure OOB channel.

19. The at least one non-transitory machine-readable storage medium of claim 15, the processor element a first processor element and the encryption key a first encryption key, the computing device caused to:
receive power state transition information, the power state transition information to include an indication a second processor element is to transition from a third power state to a fourth power state; and
provision a second encryption key to the second processor element on the received power state transition information.

20. The at least one non-transitory machine-readable storage medium of claim 15, the computing device to comprise a secure processing element and a secure computer readable storage.

21. A computer-implemented method comprising:
receiving power state transition information via a first secure out-of-band (OOB) channel at a glitch avoidance manager (GAM) within a trusted execution environment (TEE) comprised in hardware, the power state transition information to include an indication a processor element comprised in hardware external to the TEE is to transition from a first power state to a second power state, the processor element utilized to access the encrypted media with the encryption key; and
provisioning the encryption key to the processor element via a second secure OOB channel based on the received power state transition information.

22. The computer-implemented method of claim 21, comprising:
receiving power state transition information, the power state transition information to include an indication the processor element is to transition from the second power state to the first power state and back to the second power state;
determining the encryption key provisioned to the processor element; and
re-provisioning the encryption key to the processor element based on the received power state transition information.

23. The computer-implemented method of claim 21, comprising receiving the power state transition information from a power management unit via the first secure OOB channel.

24. The computer-implemented method of claim 21, the processor element a first processor element and the encryption key a first encryption key, the method comprising:
receiving power state transition information, the power state transition information to include an indication a second processor element is to transition from a third power state to a fourth power state; and
provisioning a second encryption key to the second processor element on the received power state transition information.

25. The computer-implemented method of claim 21, the processor element to comprise a processor element for a graphics processor, a display, a media encoder, or a media decoder.

* * * * *